United States Patent

[11] 3,579,210

[72] Inventors Heinrich Eduard Van Bruck;
Theodoor Holtwijk, Emmasingel,
Eindhoven, Netherlands
[21] Appl. No. 809,704
[22] Filed Mar. 24, 1969
[45] Patented May 18, 1971
[73] Assignee U.S. Philips Corporation
New York, N.Y.
[32] Priority Apr. 10, 1968
[33] Netherlands
[31] 6,805,155

[54] MATRIX STORAGE DEVICE
4 Claims, 5 Drawing Figs.

[52] U.S. Cl. .......... 340/174
[51] Int. Cl. .......... G11c 7/04, G11c 5/02, G11c 11/06
[50] Field of Search .......... 340/174; 307/88

[56] References Cited
UNITED STATES PATENTS
2,919,434 12/1959 Mestre .......... 340/174
3,214,601 10/1965 Christopherson .......... 307/88

*Primary Examiner*—Stanley M. Urynowicz, Jr.
*Attorney*—Frank R. Trifari

ABSTRACT: In order to reduce stray of the output voltage in reading information from a magnetic matrix store, the information is written as many times in the inverted state as in the noninverted state, on average, so that the heat dissipation on an average is the same for all cores. The inverted or noninverted state of the written information is recorded by an auxiliary core joined to each word, which core is read when the information of the word concerned is read.

INVENTOR.
HEINRICH E. VAN BRÜCK
THEODOOR HOLLWIJK
BY
Frank R. Trifari
AGENT

INVENTOR.
HEINRICH E. VAN BRÜCK
THEODOOR HOLLWIJK
BY
Frank Trifari
AGENT

MATRIX STORAGE DEVICE

The invention relates to a matrix storage device comprising a plurality of cores of magnetic material having a rectangular hysteresis loop arrayed in rows and columns of a matrix, the cores of the same row (word) being coupled with the same word conductor and the cores of the same column being coupled with the same column conductor or information conductor.

In stores of this kind writing information in the cores of the same row (word) is performed by passing a current through the word conductor concerned and a positive or a negative current in accordance with the desired information through the various information conductors.

Reading information of a given word is performed by passing a current opposite the first-mentioned current through the word conductor concerned, a reaction pulse being induced in the information conductor which pulse is characteristic of the information of the read cores.

This involves the difficulty that the magnitude of the magnetic flux in the cores and hence the magnitude of the reaction pulse in reading depend comparatively intimately on the temperature of the cores.

It has been found that in general the temperature of the cores is not equal to the ambient temperature and that the temperature may be highly different with different cores. This is due to the fact that at the change of the magnetic state heat dissipation occurs in the cores so that the temperature of the cores will be higher in accordance with more frequent changes of state. In the cores of a store representing the most significant bits will in general be written the digit 0, whereas the cores of the least significant bits will equally often be in the state 1 and in the state 0.

this has a particularly disturbing effect in stores in which, in order to attain a high working speed, the cores are operated only partially in this case, magnetic flux variations are smaller than the difference between the two states of saturation so that a small variation of the flux, for example, due to change of temperature, will play a comparatively important part.

The invention mitigates these difficulties.

The invention is characterized in that the information to be recorded is applied to the various information conductors through gate circuits which transfer the information inverted or not inverted to the information conductors in dependence upon the state of a bistable trigger which is on an average in time as many times in one state and in the other state, this state being recorded in binary form in at least one auxiliary core added to each word. In reading the information of a given word, the information of the auxiliary core concerned constitutes the indication of the inversion or noninversion of the recorded word.

Figure 1:
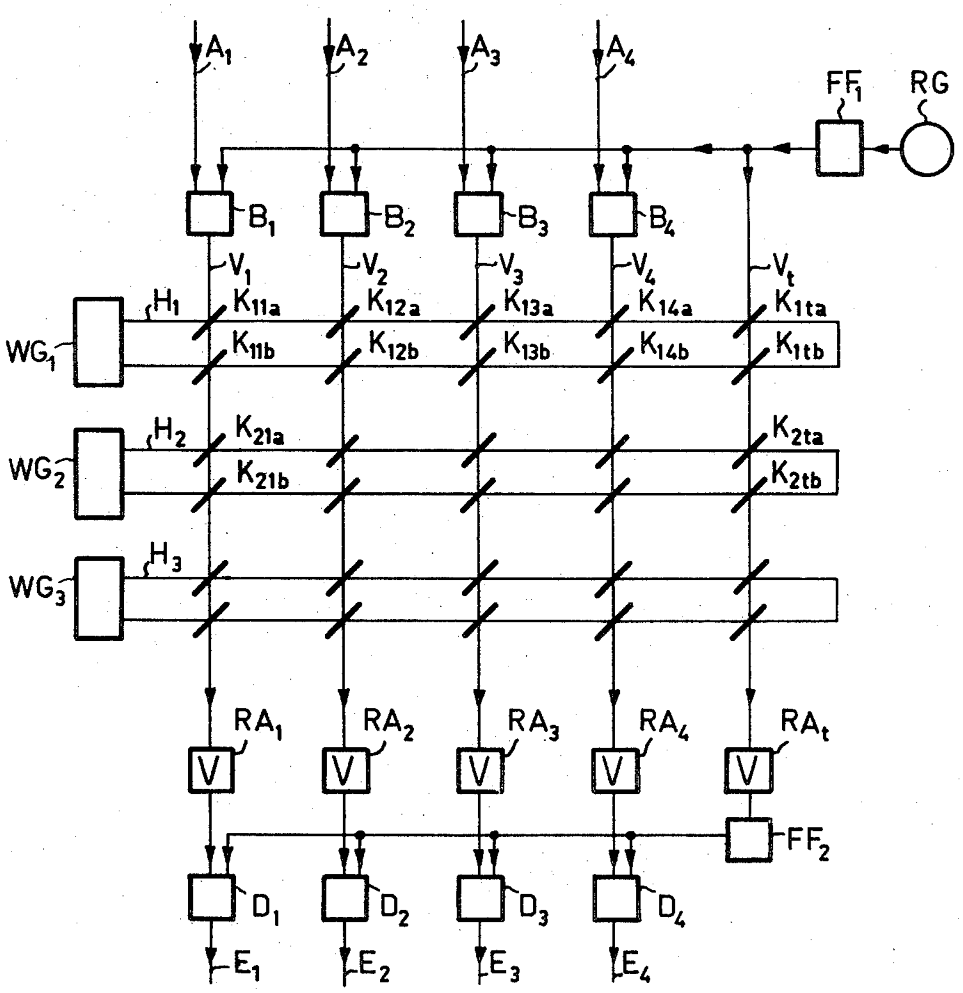

The invention will be described more fully with reference to the drawing in which, FIG. 1 shows schematically one embodiment of a binary storage device according to the invention and FIGS. 2, 3*a*, 3*b* and 4 illustrate diagrams.

The store shown in FIG. 1 comprises a plurality of cores $K_{11a}$, $K_{11b}$, $K_{12a}$, $K_{12b}$, $K_{21a}$, $K_{21b}$, etc. arrayed in rows and columns of a matrix. The cores are joined pairwise and each pair, for example, $K_{11a}$ and $K_{11b}$, $K_{12a}$ and $K_{12b}$, $K_{21a}$ and $K_{21b}$, corresponds to one bit or binary digit or in other words the store is of the type having two cores per bit.

The cores of the same column are coupled with the same information conductor, for example, $V_1$, $V_2$, $V_3$, etc. The cores of the same row are coupled with the same horizontal conductor or word conductor $H_1$, $H_2$, etc. so that the cores of each pair are invariably coupled magnetically in opposite senses with the word conductors as compared with the coupling with the information conductors.

The cores coupled with the same word conductor correspond to the same information word.

Figure 2:
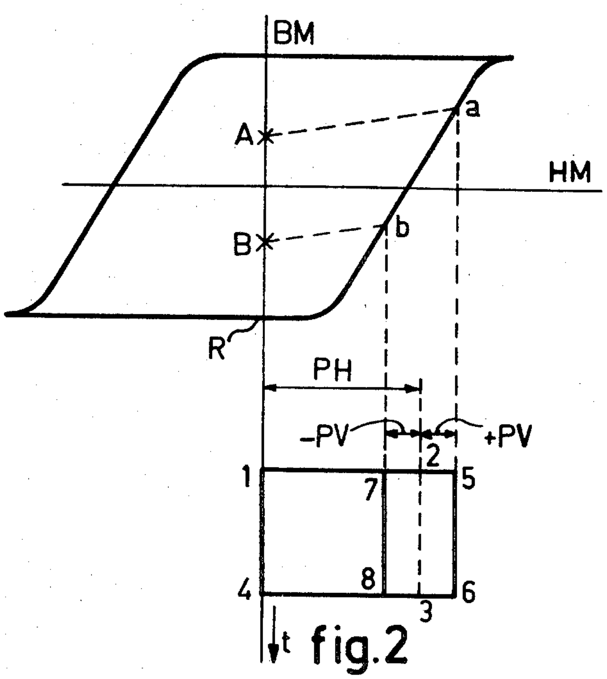
Figure 3A:
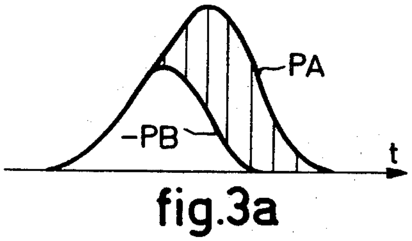
Figure 3B:
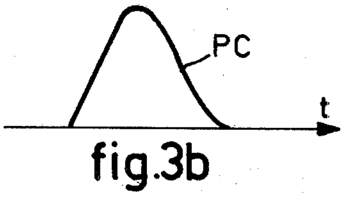

FIG. 2 shows an example of the hysteresis loop of the magnetic core material, in which on the axes BM and HM are plotted the magnetic inductance (B) and the magnetic field (H) respectively. In the rest position, after information is read, the cores are in the state of magnetic remanence R.

When information has to be written in the cores of a given word, a write pulse (PH) from a word pulse generator $WG_1$, $WG_2$, $WG_3$ is applied to the word conductor concerned $H_1$, $H_2$ or $H_3$. FIG. 2 shows furthermore a time axis $t$ in vertical direction. The pulse concerned is illustrated in the diagram by the rectangle 1, 2, 3, 4. Simultaneously information is supplied through the conductors $A_1$, $A_2$, etc. and the input gates $B_1$, $B_2$, $B_3$ etc. so that in the magnetic conductors $V_1$, $V_2$, $V_3$, etc. in accordance with the desired information a positive current (+PV) or a negative current (−PV) is produced. Since, as stated above, the cores of each pair are coupled in opposite senses with the vertical conductors, the last-mentioned currents through the one core of each pair will amplify the effect of the pulse on the word conductor H so that a total effective pulse 1, 5, 6, 4 is obtained, whereas said current of the other core will counteract the effect, so that an effective pulse 1, 7, 8, 4 is produced. The first-mentioned core will be driven into the state *a* during the pulses and at the termination of the pulses it will change over to the state A, whereas in a similar manner the other core changes via the state *b* to the state B. It depends upon the direction of the current through the bit conductor which of the two cores of each pair will get into the state A and which will pass to the state B.

For reading information of a given word a pulse of a sense opposite that of writing is applied through the word pulse generator $WG_1$, $WG_2$, etc. to the associated word conductor so that all cores of the word return to the remanence state R. The cores being in the state A then induce a pulse PA (FIG. 3*a*) in the associated information conductor $V_1$, $V_2$, etc., the magnitude of which pulse is proportional to the difference of magnetic flux between the points A and R (FIG. 2), whereas the cores being in the state B provide a pulse −PB, which is proportional to the difference of the flux between the points B and R. Thus an effective output pulse is produced at the associated bit conductor which pulse PC (FIG. 3) is the difference between the pulses PA and PB and the polarity of which pulse depends upon which of the two cores was in the state A and hence upon the information 1 or 0 written in the core pair. These output pulses are transferred through the read amplifiers $RA_1$, $RA_2$, etc. and the output gates $D_1$, $D_2$, etc. to the output conductors $E_1$, $E_2$, etc.

The store so far described is known.

Figure 4:
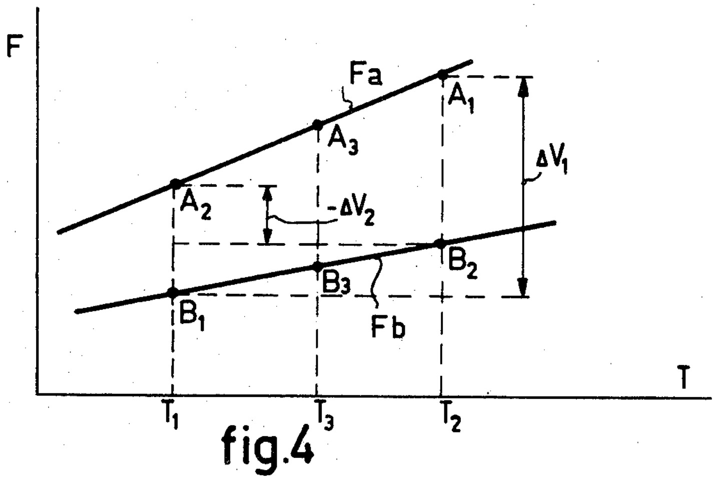

In the diagram of FIG. 4 it is illustrated how the magnetic flux F in the cores varies with the temperature T. The line F*a* relates to cores in the state A and the line F*b* relates to cores in the state B. The positions of the points A and B in the diagram of FIG. 2 thus depend upon the temperature of the cores concerned.

When in a given pair of cores, for example, the pair $K_{11a}$ and $K_{11b}$, corresponding to the most significant bits, the binary digit 0 is written and read for a long period, the flux in one core, for example, $K_{11a}$ will constantly vary between the points A and R of FIG. 2 and that of the other core between the points B and R. The flux variations in the core $K_{11a}$ are therefore greater than in the core $K_{11b}$ so that the temperature of the core $K_{11a}$ will be higher than that of the core $K_{11b}$, for example, $T_2$ and $T_1$ respectively, as is indicated in FIG. 4. The state of the core $K_{11a}$ with written information will therefore correspond in FIG. 4 with point $A_1$ and that of the core $K_{11b}$ will correspond with point $B_1$. When reading information an output pulse $V_1$ will be produced, the magnitude of which is proportional to the difference in height between the points $A_1$ and $B_1$. When exceptionally the digit 1 is written in the core pair, the core $K_{11a}$ with the temperature $T_2$ gate into the state B, which corresponds to the point $B_2$ of FIG. 4, whereas the core $K_{11b}$ will correspond to the point $A_2$ of FIG. 4. During reading an output pulse $-V_2$ is produced, whose magnitude is considerably lower than $V_1$. It has been found that under these conditions the pulse $V_2$ may even be reduced to zero or it may even be of opposite polarity.

In order to avoid these difficulties, the following steps are taken in the device shown in FIG. 1.

The input gates $B_1$, $B_2$, etc. are formed by changeover switches controlled by the bistable trigger $FF_1$. The trigger $FF_1$ is controlled in known manner by a noise generator RG so that on an average of time the trigger $FF_1$ is as many times in one state as in the other. The changeover switches $B_1$, $B_2$, etc. are controlled by the trigger $FF_1$ so that, when the trigger is in one state, the information of the conductors $A_1$, $A_2$, etc. is transferred, whereas, when the trigger is in the other state, this information is transferred in an inverted state.

Since on an average of time the information is inverted as many times as it is not inverted during writing, the cores of each pair will, independent of the information, be on an average as many times in the state A as in the state B. This means that the cores will assume the mean temperature $T_3$ (FIG. 4), which is approximately the same for the various cores.

In order to indicate whether during writing the information is inverted or not inverted, each word has joined to it a pair of auxiliary cores $K_{1ta}$, $K_{2ta}$, $K_{2tb}$, which are controlled, when information is written in a given word via the conductor $V_t$, by the trigger $FF_1$ so that the core pair concerned is driven into a state which is characteristic of the instantaneous state of the trigger $FF_1$.

When information is read, these auxiliary cores are also read, so that through the read amplifier $RA_t$ the trigger $FF_2$ is driven into a given state which corresponds with the state of the trigger $FF_1$ when the information is written in the word concerned. The output gates $D_1$, $D_2$, etc., like the gates $B_1$, $B_2$, etc. are formed by changeover switches, which are controlled by the trigger $FF_2$ so that the output pulses of the conductors $V_1$, $V_2$, etc. are directly transmitted to the conductors $E_1$, $E_2$, etc. when the information is not inverted during writing, whereas the output pulses are inverted in the gates $D_1$, $D_2$ etc., when during writing the information is inverted. Consequently, the information invariably appears noninverted at the output conductors $E_1$, $E_2$ independently of the fact whether it is inverted or not inverted when written in the cores.

We claim:

1 A matrix storage device for providing averaging of heat dissipation due to switching in a core memory array comprising a plurality of cores of magnetic material having a rectangular hysteresis loop and arranged in rows and columns of a matrix, each of the cores of a row being coupled with a row conductor, each of the cores of a column being coupled with a column conductor, each of said row conductors including at least one auxiliary core, means for applying writing signals, a plurality of gating means coupled between said means applying writing signals and each of said columns, said gating means distributing said writing signals to said columns in an inverted or noninverted state in accordance with either of two gating means conditions, control means for varying said gating means between said conditions resulting in each of said states, said control means varying said gating means over an average in time in both of said conditions, means coupling said auxiliary core to said control means, said auxiliary core state responsive to said control means and indicative of said gating means condition, and reading means coupled to said auxiliary core for providing an indication of the inverted or noninverted condition of said written signals.

2. The combination of claim 1 wherein each of said row conductors includes two cores per column conductor arranged in row pairs, and an auxiliary core for each of said rows.

3. The combination of claim 1 wherein said control means includes a generator coupled to a flip-flop, the output of said flip-flop being coupled to an input of each said gating means coupled to a column and to said auxiliary core.

4. The combination of claim 1 wherein said reading means includes a flip-flop coupled to said auxiliary core for assuming a state in accordance with said auxiliary core state, a plurality of gates, each associated with a respective column and each responsive to the condition of said flip-flop for providing an inverted or noninverted output read from said column in accordance with the signal written therein.